(12) United States Patent  
Murakami et al.

(10) Patent No.: US 10,539,072 B2
(45) Date of Patent: Jan. 21, 2020

(54) HEAT SOURCE COVER

(71) Applicant: HONDA MOTOR CO., LTD., Tokyo (JP)

(72) Inventors: Kyoshiro Murakami, Wako (JP); Atsushi Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/303,222

(22) PCT Filed: May 25, 2017

(86) PCT No.: PCT/JP2017/019471
§ 371 (c)(1),
(2) Date: Nov. 20, 2018

(87) PCT Pub. No.: WO2017/204279
PCT Pub. Date: Nov. 30, 2017

(65) Prior Publication Data
US 2019/0203641 A1 Jul. 4, 2019

(30) Foreign Application Priority Data
May 25, 2016 (JP) ................ 2016-104283

(51) Int. Cl.
*F02B 77/11* (2006.01)
*B60R 13/08* (2006.01)
*F01N 13/14* (2010.01)

(52) U.S. Cl.
CPC .......... *F02B 77/11* (2013.01); *B60R 13/0876* (2013.01); *F01N 13/14* (2013.01); *F01N 2260/20* (2013.01)

(58) Field of Classification Search
CPC .......... F02B 77/11; F02B 39/00; F02B 77/13
See application file for complete search history.

(56) References Cited

U.S. PATENT DOCUMENTS 6,126,410 A * 10/2000 Kung ................. F04B 39/0005
137/855
9,683,456 B2 * 6/2017 Burmester ................. F02C 6/12
(Continued)

FOREIGN PATENT DOCUMENTS

JP 6-332135 A 12/1993
JP 9-177564 A 7/1997
(Continued)

OTHER PUBLICATIONS

International Search Report dated Jul. 18, 2017, issued in counterpart application No. PCT/JP2017/019471 (2 pages).

*Primary Examiner* — Long T Tran
(74) *Attorney, Agent, or Firm* — Westerman, Hattori, Daniels & Adrian, LLP

(57) ABSTRACT

An exhaust manifold cover is provided with a plate-shaped cover member for covering at least a part of a heat source. The cover member has a first affixation section and a second affixation section, which are affixed so as to be in contact with the heat source. A bellows section in which ridges and grooves extending in a transverse direction perpendicular to a centerline passing through the first and second affixation sections are alternately formed is provided on the cover member at a position between the first and second affixation sections. The bellows section has formed therein a groove pair composed of two grooves having different widths of the two grooves composing the groove pair, the first groove which is near the first affixation section has a greater width than the second groove which is near the second affixation section.

16 Claims, 11 Drawing Sheets

(56) References Cited

U.S. PATENT DOCUMENTS

| | | | |
|---|---|---|---|
| 2007/0080194 A1 | 4/2007 | Duckek et al. | |
| 2007/0254539 A1* | 11/2007 | Yazaki | F02B 61/045 440/77 |
| 2007/0271911 A1* | 11/2007 | Stadler | F01N 13/082 60/323 |
| 2017/0335764 A1* | 11/2017 | Morelli | F02B 77/11 |

FOREIGN PATENT DOCUMENTS

| | | |
|---|---|---|
| JP | 10-103052 A | 4/1998 |
| JP | 10-252458 A | 9/1998 |
| JP | 2002-235554 A | 8/2002 |

\* cited by examiner

FIG. 7A
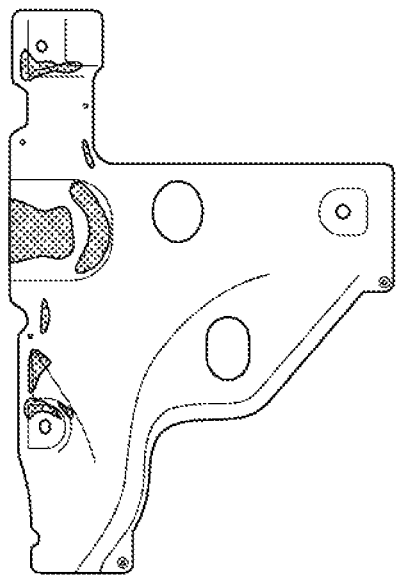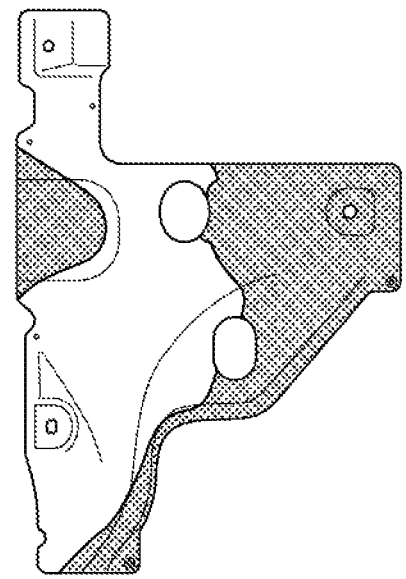
FIG. 7B
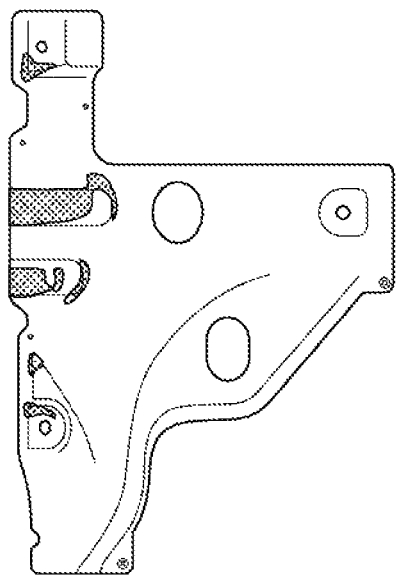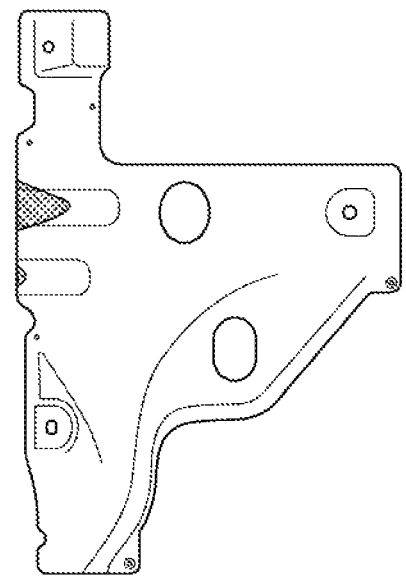

FIG. 7C
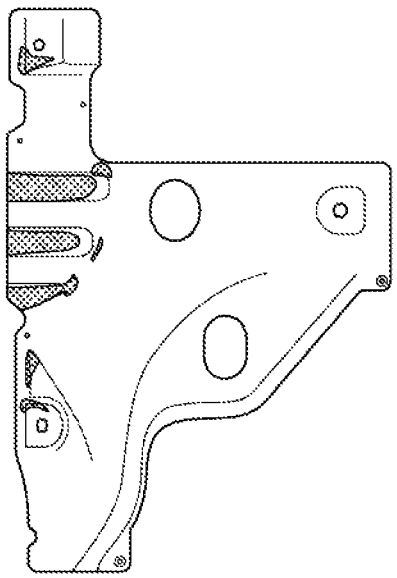
(REFERENCE EXAMPLE 4)
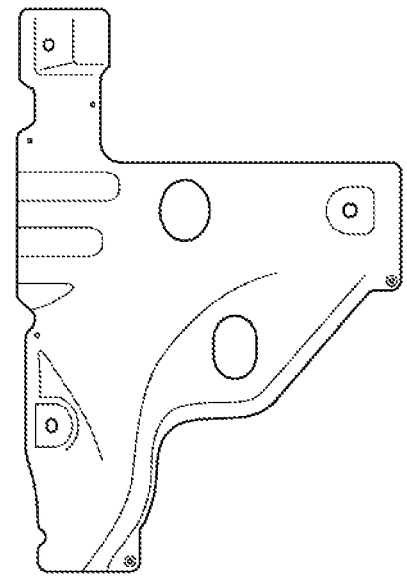

(REFERENCE EXAMPLE 5)

(REFERENCE EXAMPLE 6)

(REFERENCE EXAMPLE 7)

(REFERENCE EXAMPLE 8)

HEAT SOURCE COVER

TECHNICAL FIELD

The present invention relates to a heat source cover. In detail, it relates to a heat source cover which is fixed by contacting by at least two portions with a heat source which can expand due to heating, and covers at least part of this heat source.

BACKGROUND ART

In the engine room of a vehicle, various heat sources are housed which generate heat and vibrate accompanying traveling of the vehicle, such as the engine, exhaust manifold, turbocharger and catalytic converter. To these heat sources, a sheet-like heat source cover is fixed (for example, refer to Patent Document 1). By covering heat sources with such a heat source cover, part of the heat and sound generated by the heat source is isolated.

Patent Document 1: Japanese Unexamined Patent Application, Publication No. 2002-235554

DISCLOSURE OF THE INVENTION

Problems to be Solved by the Invention

However, the heat source expands by heat generation. For this reason, when the heat source expands during traveling of the vehicle, the heat source cover fixed to this heat source will deform due to the affixation sections displacing. In addition, the conductive heat and radiant heat generated by the heat source is transmitted to the heat source cover, and thermal strain occurs to deform due to the temperature of the heat source cover itself rising. Therefore, there are cases where ribs are provided to the heat source cover in order to suppress deformation caused by such heat generation of the heat source. However, by simply providing a rib, although deformation of a portion thereof is suppressed, large stress may occur locally at a specific location other than the portion to which the rib was provided. When a portion at which stress concentration occurs exists in the heat source cover in this way, there is concern over the heat source cover breaking starting at this portion.

The present invention has an object of providing a heat source cover that can suppress stress concentration at a specific location, which is a heat source cover fixed to the heat source which can expand due to heat generation.

Means for Solving the Problems

A heat source cover (for example, the exhaust manifold cover C1 described later) according to a first aspect of the present invention includes: a sheet-like cover member (for example, the cover member 6 described later) which covers at least part of a heat source (for example, the engine body 1, exhaust manifold 2, exhaust pipe 4 and catalytic converter 5 described later), in which the cover member includes a first affixation section (for example, the first affixation section FP1 described later) and a second affixation section (for example, the second affixation section FP2 described later) which are fixed by contacting with the heat source; a bellows section (for example, the bellows section 9 described later), in which a ridge (for example, the ridge 92 described later) and a groove (for example, the first groove 91 and second groove 93 described later) extending in a direction perpendicular to a center line (for example, the center line O described later) passing through the first and second affixation sections are alternately formed, is provided between the first and second affixation sections of the cover member; an integrated value of the cross-sectional area perpendicular to the center line from a center point between the first affixation section and the second affixation section until the first affixation section is smaller than an integrated value of the cross-sectional area from the center point until the second affixation section; a pair of stripes configured by two grooves of different width or two ridges of different width is formed in the bellows section; and among two stripes (for example, the first groove 91 and second groove 93 described later) configuring the pair of stripes, a stripe (for example, the first groove 91 described later) closer to the first affixation section has larger width than a stripe (for example, the second groove 93 described later) closer to the second affixation section (i.e. W1>W2).

According to a second aspect of the present invention, in this case, it is preferable for distances from respective apexes of the two stripes constituting the pair of stripes until a virtual fixing surface (for example, the fixing surface S described later) which includes the first affixation section and the second affixation section to be substantially equal; a shape of a cross section parallel to the center line of the two stripes constituting the pair of stripes to be a circular arc shape specified by a central position and a radius of curvature; and the stripe closer to the first affixation section among the two stripes constituting the pair of stripes to have a larger radius of curvature (i.e. R1>R2), and the central position is farther from the fixing surface, than the stripe closer to the second fixing surface.

According to a third aspect of the present invention, in this case, it is preferable for the heat source to include an engine body (for example, the engine body 1), and an exhaust manifold (for example, the exhaust manifold 2 described later) which is fixed to the engine body; and for the cover member is fixed at the first and second affixation sections to the engine body by fastening with fastening members (for example, the fastening bolts B1, B2 described later).

According to a fourth aspect of the present invention, in this case, it is preferable for a rib (for example, the upper rib 77 described later) extending substantially in parallel with the center line to be formed in the cover member between the bellows section and the first affixation section.

According to a fifth aspect of the present invention, in this case, it is preferable for the stripe closer to the first affixation section among the two stripes constituting the pair of stripes to have a longer length along the center line than the stripe closer to the second affixation section.

According to a sixth aspect of the present invention, in this case, it is preferable for the first affixation section and the second affixation section to be respectively provided to bottoms of a first seating surface (for example, the first seating surface 73 described later) and a second seating surface (for example, the second seating surface 74 described later) formed by conducting drawing on sheet material; and the first seating surface to be deeper than the second seating surface.

Effects of the Invention

With the heat source cover according to the first aspect of the present invention, the sheet-like cover member is fixed by contacting with the heat source by the first affixation section and second affixation section. Then, the bellows section, in which the ridge and groove extending in a direction perpendicular to the center line passing through the first and second affixation sections are alternately formed, is provided in the cover member between the first affixation section and second affixation section. If the heat source elongates by way of heat generation, the cover member will deform such that the first affixation section and second affixation section are pulled in direction distancing from each other due to the elongation of this heat source, and stress will occur in each portion. There is a trend for stress concentration to tend to occur in the vicinity of the first affixation section and second affixation section to which force for displacing the first affixation section and second affixation section is directly inputted, in relation to deformation in the longitudinal direction along the center line caused by such elongation of the heat source. With the present invention, by providing the bellows section between this first affixation section and second affixation section, elongation along the longitudinal direction is actively permitted at the bellows section in relation to the aforementioned such deformation in the longitudinal direction. Therefore, since the stress occurring at the cover member is dispersed over a broad range in relation to the deformation in the longitudinal direction, it is possible to suppress stress concentration from occurring in the vicinities of the first and second affixation sections in the aforementioned way.

However, if the shape of the cover member is left/right symmetrical about the center point of the first affixation section and second affixation section, the magnitude of stress generated in relation to the above-mentioned such deformation in the longitudinal direction will be equal at the first affixation section side and second affixation section side. However, in many cases, the shape of the cover member is not symmetrical, and a difference arises in the magnitudes of stress generated at the first affixation section side and second affixation section side. Therefore, with the present invention, the integrated value along the center line of the cross-sectional area of the cover member is used as the target indicating the difference in magnitude of stress occurring during deformation along the longitudinal direction. When the integrated value of the cross-sectional area, i.e. volume, is small, since the portion capable of dispersing the stress becomes smaller by this amount, the stress concentration tends to occur at a specific location having such a small volume. With the present invention, a case is assumed of the integrated value of the cross-sectional area from the center point between the first affixation section and the second affixation section until the first affixation section FP1 being smaller than the integrated value of the cross-sectional area from the center point until the second affixation section, i.e. case of stress concentration tending to occur more on the side of the first affixation section than on the side of the second affixation section. Then, with the present invention, the a pair of stripes constituting by two grooves having different widths or two ridges having different widths is formed in the bellows section, and the width of the stripe close to the first affixation section at which it is considered that stress concentration tends to occur as mentioned above among the two stripes constituting this pair of stripes, is made larger than the width of the stripe close to the second affixation section. Since greater elongation is permitted in the longitudinal direction toward the first affixation section by the bellows section, it is possible to disperse the stress generated relative to deformation to the longitudinal direction over a wide range from the first affixation section until the second affixation section, and possible to suppress stress concentration from occurring at the side of the first affixation section FP1 which should be given particular attention.

The cover member according to the second aspect of the present invention is provided along the surface of the heat source; therefore, the interval between the surface of the cover member on the side of the heat source and the surface of the heat source is short. In addition, since various components are provided within the engine room, there are also cases whether the interval between the surface on an opposite side to the heat source of the cover member and the surface of another component becomes short. From such restrictions in shape, since there are cases where there is no choice but to constantly arrange the distances between respective apexes of the two stripes constituting the pair of stripes formed in the bellows section and the virtual fixing surface including the first affixation section and second affixation section, i.e. projecting length from the fixing surface of the two strips constituting the pair of stripes, it may be difficult to freely set the magnitude of width thereof. With the present invention, the shape of the cross section of the two stripes constituting the pair of stripes formed in the bellows section is defined as a circular arc specified by the central position and radius of curvature, and the radius of curvature is made larger for the stripe closer to the first affixation section among the two stripes constituting the pair of stripes, than the stripe close to the second affixation section, and further, the center position thereof is set farther from the fixing surface. It is thereby possible to make the width of the stripe close to the first affixation section greater than the width of the stripe close to the second affixation section, while constantly arranging the distances between respective apexes of the two stripes constituting the pair of stripes and the fixing surface. In other words, it is possible to keep the constraints in shape demanded when fixing the cover member to the heat source, while realizing the function of mitigating stress concentration (hereinafter referred to as "stress dispersing function") demanded in the bellows section. In addition, by establishing the cross-sectional shape of the two stripes constituting the pair of stripes in a smooth circular arc with the present invention, it is possible to disperse stress by a wider surface compared to a shape including a linear cross section, and consequently, it is possible to further improve the stress dispersing function of the bellows section.

According to the third aspect of the present invention, the engine body has large temperature change, and thus the thermal deformation thereof is also large. With the present invention, the engine body and the exhaust manifold thereof are defined as heat sources, and the cover member is fixed by fastening at the first and second affixation sections to the engine body having large thermal deformation by the fastening members in the above-mentioned way. It is thereby possible to exhibit the stress dispersing function possessed by the cover member 6, and suppress a stress concentration from occurring at a specific location of the cover member.

According to the fourth aspect of the present invention, between the first fixing point and the bellows section having a small integrated value of cross-sectional area, it is considered that stress concentration tends to occur and deformation tends to occur as mentioned above, more than between the second fixing point and the bellows section. With the present invention, by forming the rib extending substantially in parallel with the center line between the first affixation section and the bellows section, it is possible to suppress deformation between the first affixation section and the bellows section at which it is considered that more stress concentration tends to occur. It should be noted that, when providing such a rib, as a result of deformation in the rib being suppressed, stress concentration tends to occur at the surrounding of the rib; however, with the present invention, by providing the rib in the bellows section on the side of the first affixation section which has large width and exhibits high stress dispersing function, it is possible to suppress stress concentration in the vicinity thereof, while improving the rigidity of the weak portion on the side of the first affixation section.

With the fifth aspect of the present invention, in addition to setting the width of the stripe close to the first affixation section, at which it is considered that stress concentration tends to occur as mentioned above, to be larger among the two stripes constituting the pair of stripes formed in the bellows section, the length along a direction substantially perpendicular to the center line is made longer. It is thereby possible to exhibit greater stress dispersing function over a wider range on the side of the first affixation section at which stress concentration tends to occur, than on the side of the second affixation section.

With the sixth aspect of the present invention, the first and second affixation sections are respectively provided to the bottoms of the first and second seating surfaces formed by conducting drawing on the sheet material. Since it is thereby possible to fasten and fix the cover member to the heat source at the first and second affixation sections by configuring so as to avoid a member being provided in the vicinity of the first and second affixation sections of the heat source, the convenience improves. It should be noted that, when providing the first affixation section to the bottom of such a first seating surface which is deeper, stress concentration tends to occur in the vicinity of this first seating surface relative to the above-mentioned deformation in the longitudinal direction; however, with the present invention, by providing the first seating surface to bellows section on the side of the first affixation section which exhibits higher stress dispersing function, it is possible to suppress stress concentration on the side of the first affixation section, while improving the convenience of fastening fixing.

BRIEF DESCRIPTION OF THE DRAWINGS

FIG. 7A provides views showing the stress distribution and deformation amount distribution of an exhaust manifold cover of Comparative Example 2;

FIG. 7B provides views showing the stress distribution and deformation amount distribution of an exhaust manifold cover of Example 1;

FIG. 7C provides views showing the stress distribution and deformation amount distribution of an exhaust manifold cover of Example 2;

PREFERRED MODE FOR CARRYING OUT THE INVENTION

Figure 1:
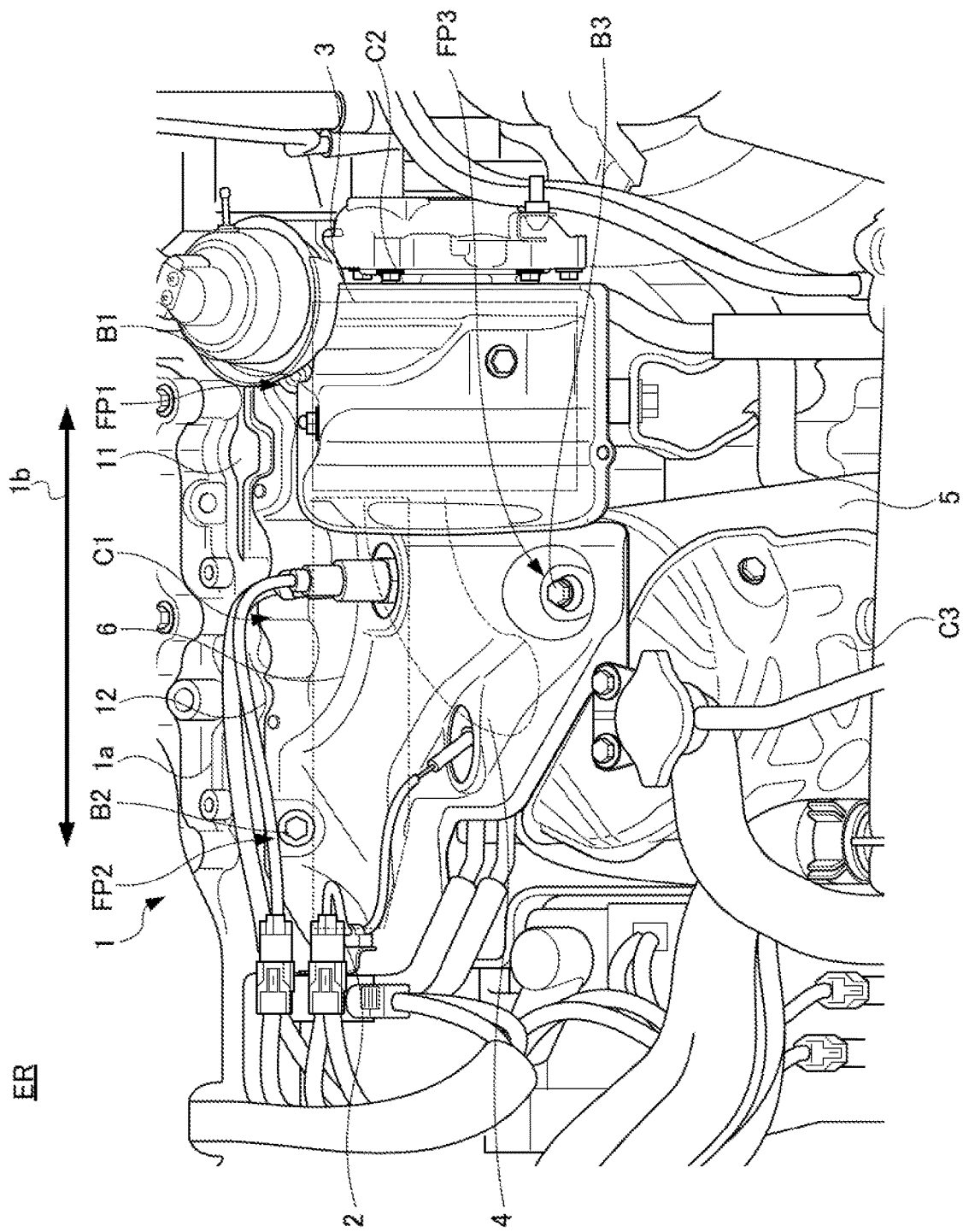
FIG. 1 is a front view of the engine room of a vehicle to which an exhaust manifold cover according to an embodiment of the present invention is applied.

Hereinafter, an embodiment of the present invention will be explained while referencing the drawings. FIG. 1 is a front view of an engine room ER of a vehicle. FIG. 1 mainly shows only the configuration of a portion of the engine room ER to which the heat source cover according to the present embodiment is applied.

In the engine room ER are provided: an engine body 1 of substantially cubic shape configured by combining a cylinder block and a cylinder head; a tubular exhaust manifold 2 in which exhaust gas emitted from the plurality of exhaust ports (not illustrated) of this engine body 1 flows; a columnar turbocharger 3 that compresses intake air using the energy of exhaust gas emitted from the exhaust manifold 2; a columnar catalytic converter 5 which accommodates a filter, catalyst, etc. for purifying the exhaust gas having passed through the turbocharger 3; an exhaust pipe 4 which connects the turbine outlet of the turbocharger 3 and the exhaust inlet of the catalytic converter 5; and a plurality of covers C1, C2 and C3 which cover parts of these. Since exhaust gas emitted from the engine body 1 flows in this engine body 1, exhaust manifold 2, turbocharger 3, exhaust pipe 4, and catalytic converter 5, all are heat sources which generate heat accompanying travel of the vehicle.

Within the engine room ER, the engine body 1, exhaust manifold 2, turbocharger 3, exhaust pipe 4, and catalytic converter 5 are supplied in order from the rear side in the traveling direction of the vehicle (upper side in FIG. 1) towards the forward side (lower side in FIG. 1). The engine body 1 is provided within the engine room ER by making the aligning direction of the plurality of cylinders (not illustrated) and the vehicle width direction substantially parallel. The exhaust manifold 2 is provided at the forward side of the engine body 1, which is the left side in FIG. 1, and the turbocharger 3 is provided at the forward side of the engine body 1, which is the right side in FIG. 1 relative to the exhaust manifold 2. The catalytic converter 5 is provided by making substantially parallel with the vertical direction at the forward side from the exhaust manifold 2. In addition, the exhaust inlet of the catalytic converter 5 is provided at a position lower than the turbine outlet of the turbocharger 3. The exhaust pipe 4 extends from the turbine outlet of the turbocharger 3 to the left side in FIG. 1, and arrives at the exhaust inlet of the catalytic converter 5.

The exhaust manifold cover C1 mainly covers parts of the engine body 1, exhaust manifold 2, exhaust pipe 4 and catalytic converter 5, among the above-mentioned plurality of heat sources. More specifically, the exhaust manifold cover C1 covers part of a lateral side 1a of the engine body 1 to which the plurality of exhaust ports are provided; a part of the exhaust manifold 2 which extends from this lateral side 1a along the vehicle width direction; a part of the exhaust pipe 4 which extends along the vehicle width direction; and a part of the catalytic converter 5 which extends in the up/down direction, and isolates part of the heat and vibration generated by these heat sources. Hereinafter, the engine body 1, exhaust manifold 2, exhaust pipe 4 and catalytic converter 5 will be collectively referred to as target heat source of the exhaust manifold cover C1. In addition, the arrow 1*b* in FIG. 1 is an arrow parallel to the cylinder aligning direction of the engine body 1, and indicates the thermal elongation direction during heat generation of the engine body 1.

So as to cover at least part of the target heat source, the exhaust manifold cover C1 includes a sheet-like cover member 6 having a three-dimensional shape along the shape of the surface of these heat sources, and a plurality of fastening bolts B1, B2 and B3 which fix the cover member 6 to the target heat source so that the cover member 6 and target heat source contact at a plurality of affixation sections FP1, FP2 and FP3 provided to this cover member 6. As shown in FIG. 1, among the plurality of affixation sections FP1 to FP3, the first and second affixation sections FP1 and FP2 are provided at portions on an upper end side of the cover member 6 which contacts with part of the lateral side 1*a* of the engine body 1, and the third affixation section FP3 is provided at a portion of the lower end side of the cover member 6 which contacts with the upper end side of the catalytic converter 5. In addition, these first and second affixation sections FP1, FP2 are provided at the upper end side of the cover member 6 in parallel with the arrow 1*b*, i.e. along the thermal elongation direction during heat generation of the engine body 1. Therefore, when the engine body 1 thermally elongates due to heat generation, the external force acts in the direction in which the first affixation section FP1 and second affixation section FP2 move away from each other.

A turbocharger cover C2 is tabular, and is fixed to the turbocharger 3 so as to mainly cover the top of the turbocharger 3 among the above-mentioned plurality of heat sources, and isolates part of the heat and vibration generated by the turbocharger 3. A catalytic converter cover C3 is tabular, and is fixed to the catalytic converter 5 so as to cover part of the top and the side of the catalytic converter 5, and isolates part of the heat and vibration generated by the catalytic converter 5.

Figure 2:
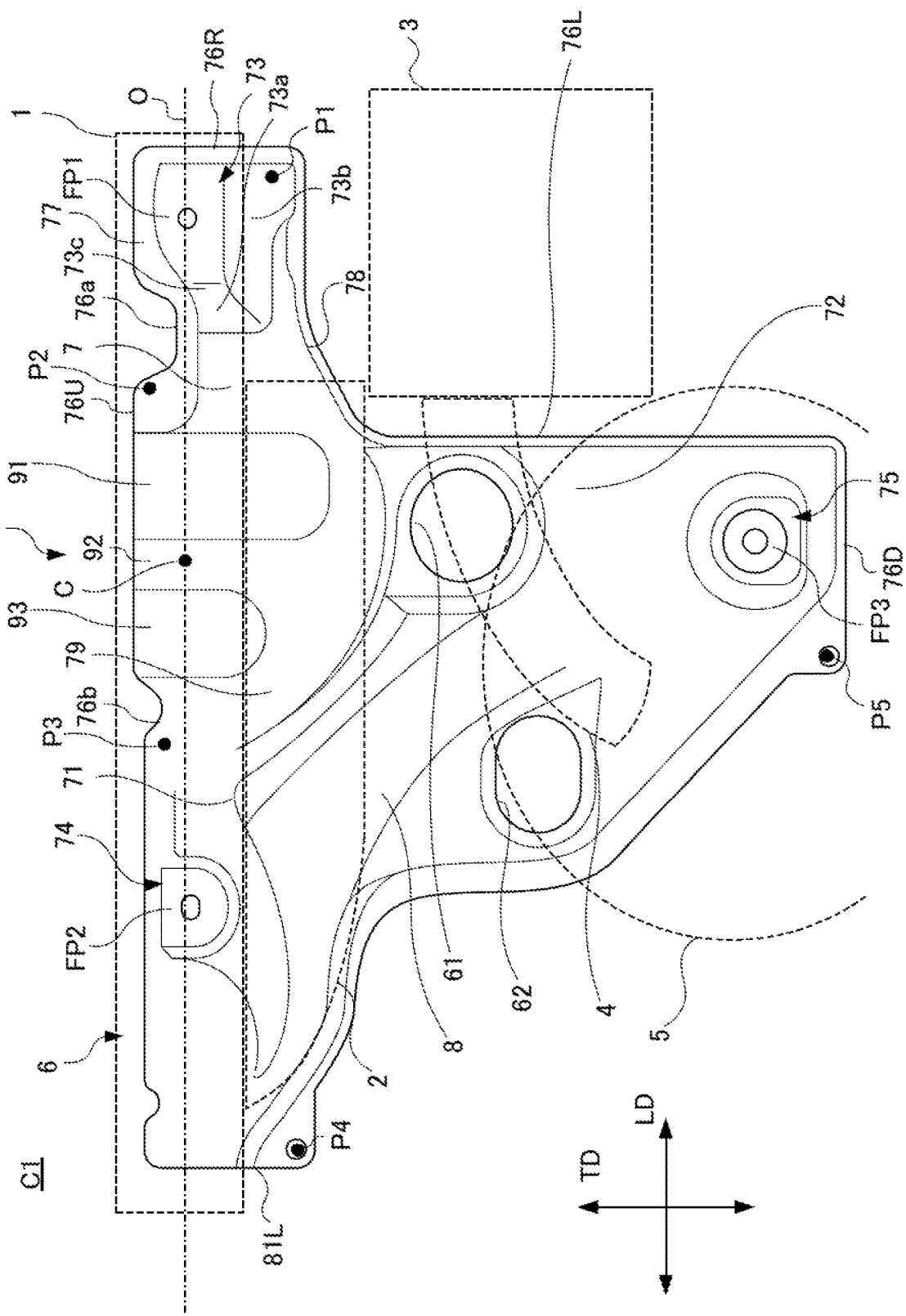
FIG. 2 is a plan view of the cover member of an exhaust manifold cover.
Figure 3:
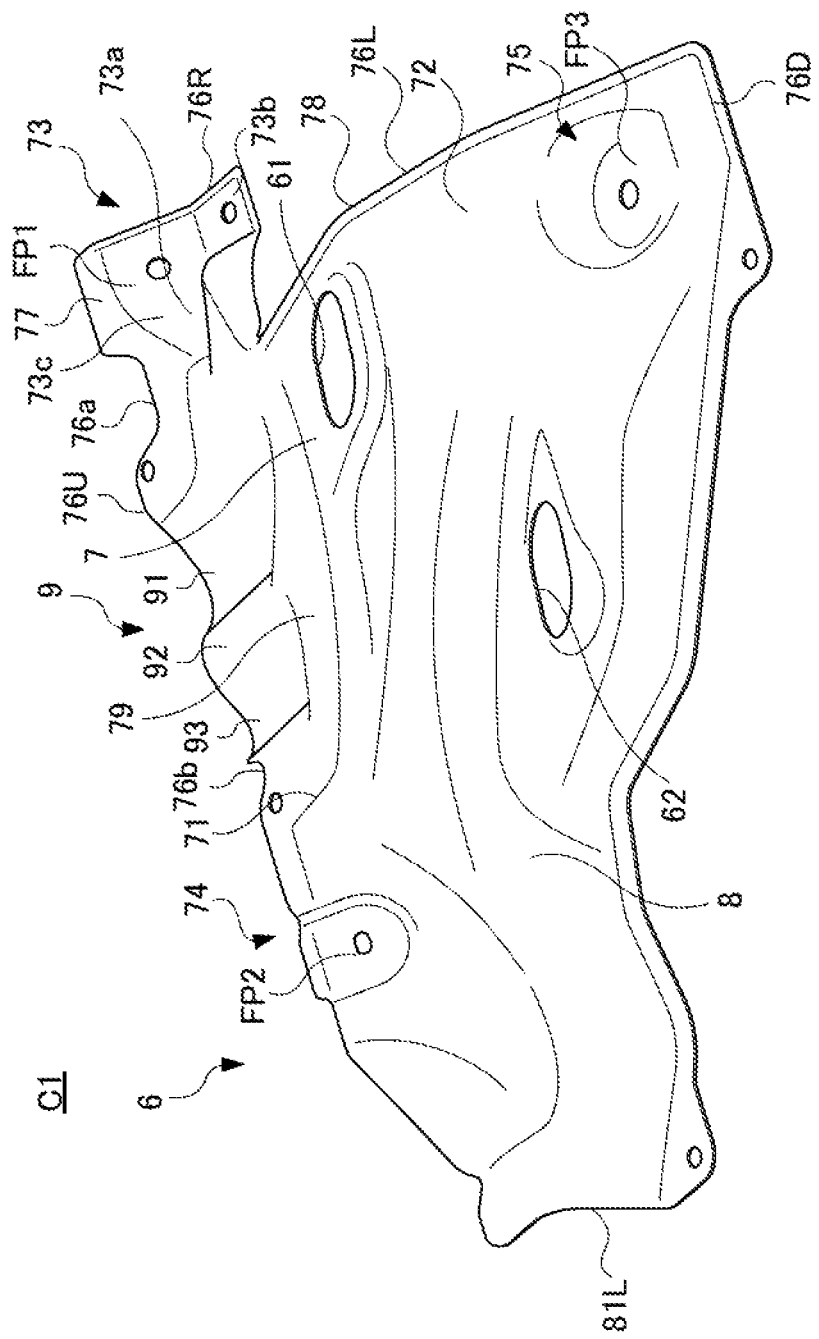
FIG. 3 is a perspective view of the cover member.

FIG. 2 is a plan view of the cover member 6 of the exhaust manifold cover C1 in a state removed from the target heat source, and FIG. 3 is a perspective view of this cover member 6. It should be noted that FIG. 2 shows the engine body 1, exhaust manifold 2, turbocharger 3, exhaust pipe 4 and catalytic converter 5, which are heat sources, by dashed lines for reference. It should be noted that, as explained by referencing FIG. 1, the first affixation section FP1 and second affixation section FP2 are provided to the exhaust manifold cover C1 along the thermal elongation direction 1*b* (refer to FIG. 1) of the engine body 1. Therefore, in the following explanation of the exhaust manifold cover C1, the extending direction of the center line O passing through this first affixation section FP1 and second affixation section FP2 (i.e. line that is parallel with the thermal elongation direction 1*b* (refer to FIG. 1) of the engine body 1 upon fixing the exhaust manifold cover C1 to the engine body 1) is defined as the longitudinal direction LD of the exhaust manifold cover C1, and the direction perpendicular to this is defined as the transverse direction TD of the exhaust manifold cover C1.

The cover member 6 includes a cover top 7, and a cover side 8 which extends while somewhat curving from the end on the left side in FIG. 2 of this cover top 7 to downwards in the vertical direction. The cover top 7 covers the exhaust manifold 2, exhaust pipe 4 and catalytic converter 5 from the upper side, and the cover side 8 covers the exhaust manifold 2 and exhaust pipe 4 from a lateral side. As shown in FIG. 2, in a state fixing the cover member 6 to the heat source, the turbocharger 3 is provided to a lower side in FIG. 2 of the first affixation section FP1 of the cover top 7, and this turbocharger 3 is covered by the turbocharger cover C2, which is a separate member from the exhaust manifold cover C1. For this reason, the edge on the lower side in FIG. 2 of the first affixation section FP1 of the cover top 7 becomes an L-shaped edge 76*c* cut into a substantially L shape in a plan view, so as to avoid the turbocharger 3.

The cover top 7 has an overall shape which is substantially T-shaped in a plan view, and is divided into a base end 71 of substantially rectangular shape which extends along the longitudinal direction LD, and a leading end 72 of substantially rectangular shape which extends forward along the transverse direction TD from a substantially central part of this base end 71.

At an end on the right side in FIG. 2 of the base end 71, a first seating surface 73 which is convex shape towards the engine body 1 and having a substantially rectangular seating surface is formed by conducting drawing. A bolt hole in which a fastening bolt B1 is inserted is formed at substantially the center of a bottom of the first seating surface 73. In other words, the bottom of this first seating surface 73 serves as a first affixation section FP1 that contacts with the engine body 1, upon fixing the cover member 6 by the fastening bolt B1.

A second seating surface 74 which is a convex shape towards the engine body 1 and has a substantially circular seating surface is formed at an end of the base end 71 on the opposite side to the first seating surface 73 by conducting drawing. A bolt hole into which a fastening bolt B2 is inserted is formed at substantially the center of the bottom of the second seating surface 74. In other words, the bottom of this second seating surface 74 serves as the second affixation section FP2 which contacts with the engine body 1 upon fixing the cover member 6 by the fastening bolt B2. It should be noted that, when comparing the depths of the first seating surface 73 and second seating surface 74, the first seating surface 73 is deeper, and lower than the circumference.

In addition, a third seating surface 75 which is a convex shape towards the catalytic converter 5 and has a substantially circular seating surface is formed at the leading end side of the leading end 72 by conducting drawing. A bolt hole in which a fastening bolt B3 is inserted is formed at substantially the center of the bottom of the third seating surface 75. In other words, the bottom of this third seating surface 75 serves as the third affixation section FP3 which contacts with the catalytic converter 5 upon fixing the cover member 6 by the fastening bolt B3.

It should be noted that these first to third affixation sections FP1 to FP3 are formed at positions such that the length between the first affixation section FP1 to third affixation section FP3 and the length between the second affixation section FP2 to third affixation section FP3 are substantially equal. In other words, these three affixation sections FP1 to FP3 are formed at the cover top 7, so that an isosceles triangle establishing an angle made by a line linking the first affixation section FP1 and third affixation section FP3 and a line linking the second affixation section FP2 and third affixation section FP3 as the vertical angle is formed in general.

In order to avoid contact with the plurality of convex parts 11, 12 (refer to FIG. 1) formed at the lateral side 1*a* of the engine body 1, when fixing the cover member 6 to the engine body 1, two notch parts 76a, 76b of concave shape following the shape of these convex parts 11, 12 are formed between the first affixation section FP1 and second affixation section FP2 in the upper edge 76U on the engine body 1 side of the cover top 7. The first notch part 76a is formed in the upper edge 76U at a position closer to the first affixation section FP1 than the second affixation section FP2, and the second notch part 76b is formed in the upper edge 76U at a position closer to the second affixation section FP2 than the first affixation section FP1. In addition, the width along the longitudinal direction LD and the length along the transverse direction TD of the first notch part 76a are both larger than the width and length of the second notch part 76b.

In addition, sensor mounting holes 61, 62 in which an air/fuel ratio sensor, temperature sensor, etc. provided to the exhaust pipe 4 are inserted are formed in a portion that is substantially the center of the cover member 6, and covering the exhaust pipe 4 when fixing the cover member 6 to the engine body 1 and catalytic converter 5.

When fixing by contacting the above such cover member 6 to the engine body 1 and catalytic converter 5 at the three affixation sections FP1 to FP3, stress occurs at the cover member 6 by the heat generation and vibration of the heat sources such as the engine body 1 and catalytic converter 5. Therefore, in order to mitigate the stress, vibration, etc. generated due to heat sources, a plurality of linear ribs 77, 78, 79, and a bellows section 9 are formed in the cover member 6.

The bellows section 9 is configured by ridges and grooves alternately provided between the first affixation section FP1 and second affixation section FP2, i.e. between a first notch part 76a and second notch part 76b, in the base end 71 of the cover top 7. More specifically, the first groove 91 of convex shape towards the heat source, ridge 92 of concave shape towards the heat source, and second grove 93 of convex shape towards the heat source are provided in order from the first affixation section FP1 side towards the second affixation section FP2 side in the bellows section 9. This first groove 91, ridge 92 and second groove 93 respectively extend along the transverse direction TD from the upper edge 76U of the cover top 7 until a circular rib 79 described later. It should be noted that the rigidity of the ridge 92 is higher than the rigidity of the grooves 91, 93.

The grooves 91, 93 and ridge 92 extending along the transverse direction TD, which is substantially perpendicular to the thermal elongation direction 1b (refer to FIG. 1) of the engine body 1 during fixing in the aforementioned way, are provided to the bellows section 9. For this reason, since a large stress compared to the circumference of the bellows section 9 occurs at the grooves 91, 93 and ridge 92 relative to deformation along the longitudinal direction LD of the cover member 6, deformation is actively permitted. Therefore, the bellows section 9 exhibits a stress dispersing function of mitigating the stress concentration in the circumference of the bellows section 9 in the cover member 6, during thermal elongation of the engine body 1. It should be noted that more detailed configurations of this bellows section 9 will be explained in detail while referencing FIG. 4 later.

The upper rib 77 is a concave shape towards the heat source, and is formed along the longitudinal direction LD between the first affixation section FP1 and bellows section 9 in the upper edge 76U of the cover top 7. In addition, this upper rib 77 extends from the right edge 76R on the right side in FIG. 2 of the base end 71 until the first groove 91 of the bellows section 9 along the upper edge 76U. In other words, the upper rib 77 connects the first affixation section FP1, which is the bottom of the first seating surface 73, a side wall 73a on the left side in FIG. 2 of the first seating surface 73, the first notch part 76a and the first groove 91.

A lower rib 78 is a concave shape towards the heat source, and is formed along the L-shaped edge 76L, from the first affixation section FP1 until the third affixation section FP3 in the cover top 7. More specifically, this lower rib 78 extends from substantially the center of the side wall 73b on the lower side in FIG. 2 of the first seating surface 73 until the lower edge 76D on the lower side in FIG. 2 of the third seating surface 75, along the L-shaped edge 76L.

The circular rib 79 is a concave shape towards the heat source, and is formed in the cover top 7 so as to cover the leading end side between the first groove 91, ridge 92 and second groove 93 provided in the bellows section 9. More specifically, the circular rib 79 extends in a circular arc in a plan view from the second notch part 76b formed in the upper edge 76U of the cover top 7, until the L-shaped edge 76. It should be noted that the apex of the ridge 92 of the bellows section 9 and the apex of the circular rib 79 are substantially the same height, and the ridge 92 and circular rib 79 are smoothly connected. In addition, the apex of the lower rib 78 and the apex of the circular rib 79 are also substantially the same height, and the lower rib 78 and circular rib 79 are smoothly connected.

Next, before explaining the specific configuration of the bellows section 9, the characteristics during deformation along the longitudinal direction LD of the cover member 6 will be considered. First, as shown in FIG. 2, the cover member 6 is fixed by contacting the engine body 1 at the first and second affixation sections FP1, FP2 provided along the longitudinal direction LD. Therefore, during thermal elongation of the engine body 1, external forces act in orientations moving away from each other along the longitudinal direction LD of the first and second affixation sections FP1, FP2 on the cover member 6, and stress occurs to deform at each portion of the cover member 6. At this time, since the three-dimensional shape of the cover member 6 is not symmetrical between the first affixation section FP1 side and second affixation section FP2 side as shown in FIG. 2, the stress distribution generated during the above-mentioned such thermal elongation deformation also is not symmetrical, and a difference also arises between the first affixation section FP1 side and second affixation section FP2 side for portions at which the stress concentration tends to occur. Therefore, for the stress dispersing function exhibited by the bellows section 9, it is necessary to provide a difference between the first affixation section FP1 side and second affixation section FP2 side. Hereinafter, for the configuration of the bellows section 9, the reason to configure so that the stress dispersing function is exhibited more greatly on the first affixation section FP1 side than the second affixation section FP2 side will be explained.

First, the length along the longitudinal direction LD and transverse direction TD of the first notch part 76a provided to the first affixation section FP1 side is greater than the length along the longitudinal direction LD and transverse direction TD of the second notch part 76b provided to the second affixation section FP2 side. In other words, a larger notch is formed on the first affixation section FP1 side than the second affixation section FP2 side.

Second, the first seating surface 73 to which the first affixation section FP1 is provided is formed by drawing deeper than the second seating surface 74 to which the second affixation section FP2 is provided.

Third, as shown in FIG. 2, the integrated value of the cross-sectional area along the transverse direction TD from an intermediate point C between the first affixation section FP1 and second affixation section FP2 until the first affixation section FP1 (i.e. volume of segment from intermediate point C of cover member 6 until first affixation section FP1) is smaller than the integrated value of the cross-sectional area along the transverse direction TD from the intermediate point C until the second affixation section FP2 (i.e. volume of segment from intermediate point C of the cover member 6 until second affixation section FP2). It should be noted that the matter of the integrated value of the cross-sectional area on the first affixation section FP1 side being smaller than the integrated value of the cross-sectional area on the second affixation section FP2 side, as shown in FIG. 2, is clear also from the fact that the L-shaped edge 76L is formed in the end on the first affixation section FP1 side of the cover member 6 and a portion on the lower side in FIG. 2 of the first affixation section FP1 is cut out in a substantially L shape in a plan view; whereas, the cover side 8 covering the exhaust manifold 2, etc. from the side is provided at an end on the second affixation section FP2 side of the cover member 6.

Fourth, according to the results of performing experiments using a conventional exhaust manifold cover, it becomes clear that the portion that should be given particular attention in order to prevent fatigue breaking of the exhaust manifold cover C1 and reduce the stress acting on this portion exists at a position closer to the first affixation section FP1 than the second affixation section FP2. Herein, the conventional exhaust manifold cover only differs in the point of not including the bellows section 9 and upper rib 77 from the exhaust manifold cover C1 according to the present embodiment, and the other configurations thereof are considered the same. According to the experiments using this conventional exhaust manifold, it becomes clear that a particularly great stress concentration occurs at the corner of the first seating surface on the first affixation section side, and there is concern over fatigue breaking at this portion. It should be noted that the portion at which particularly great stress concentration occurs in this conventional exhaust manifold cover corresponds to the corner 73c connecting the first affixation section FP1, which is the bottom of the first seating surface 73, and the side wall 73a and the vicinity thereof, when referring by the exhaust manifold cover C1 according to the present embodiment. Hereinafter, the above-mentioned corner 73c and portion in the vicinity thereof corresponding to the portion which should be given particular attention to reduce the stress acting on this portion of the exhaust manifold cover C1 is referred to as the target stress reduction part.

From the above such four reasons, it can be said that the configuration of the bellows section 9 should be designed so that the stress dispersing function thereof is exhibited greater at the first affixation section FP1 side than the second affixation section FP2 side relative to the deformation along the longitudinal direction LD thereof.

Figure 4:
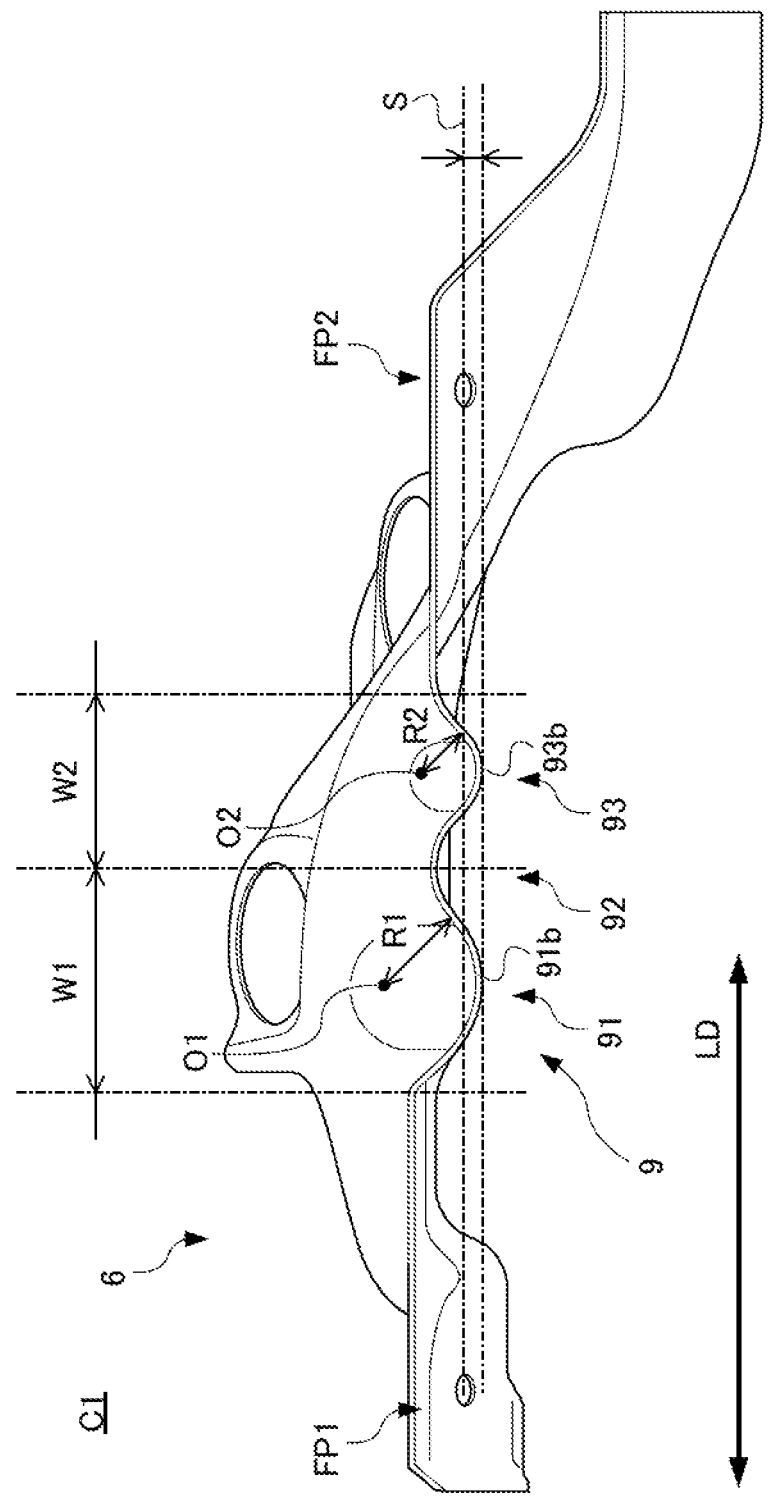
FIG. 4 is side view of a bellows side of the cover member.

FIG. 4 is a side view of the bellows section 9 side of the cover member 6. As shown in FIG. 4, the shapes of the cross sections along the longitudinal direction LD of the two grooves 91, 93 and ridge 92 are circular arcs specified by a predetermined central position and radius of curvature. In addition, the length W1 of the width along the longitudinal direction LD of the first groove 91 close to the first affixation section FP1 among the two grooves 91, 93 formed in the bellow 9 is longer than the length W2 of the width along the longitudinal direction LD of the second groove 93 close to the second affixation section FP2. In other words, the pair of grooves in the present invention is configured by the first groove 91 and second groove 93 having these differing widths in the present embodiment. It should be noted that the widths along the longitudinal direction LD of the grooves 91, 93 in the present embodiment are defined being as the length along the longitudinal direction LD between apexes adjacent to the portion serving as the target as shown in FIG. 4; however, the present invention is not limited thereto. The definition of the widths of these grooves 91, 93, so long as comparing to the length along the longitudinal direction LD of a segment contributing to the stress dispersing function by deforming, relative to the external force along the longitudinal direction LD of the cover member 6, may be any definition.

In addition, as shown in FIG. 4, the distance between the apex 91b of the first groove 91 which is a convex shape towards the heat source (i.e. portion of the first groove 91 closest to the heat source) and a virtual fixing surface S including the first affixation section FP1 and second affixation section FP2 is substantially the same as the distance between the apex 93b of the second groove 93, which is a convex shape towards the heat source (i.e. portion of the second groove 93 closest to the heat source) and the fixing surface S. The radius of curvature R1 specifying the cross-sectional shape of the first groove 91 is greater than the radius of curvature R2 specifying the cross-sectional shape of the second groove 93, and the distance between the central position O1 of the first groove 91 and the fixing surface S is longer than the distance between the central position O2 of the second groove 93 and the fixing surface S. In the aforementioned way, it is thereby possible to set the length W1 of the width of the first groove 91 to be longer than the length W2 of the width of the second groove 93, and set the distances at the first groove 91 and second groove 93 between each of the apexes 91b, 93b and the fixing surface S to be equal.

In addition, as shown in FIG. 2, the length along the transverse direction TD of the first groove 91 close to the first affixation section FP1 is longer than the length along the transverse direction TD of the second groove 93 close to the second affixation section FP2. By configuring the bellows section 9 in the above way, the stress dispersing function thereof is exhibited more greatly at the first affixation section FP1 side than the second affixation section FP2 side, relative to deformation along the longitudinal direction LD thereof.

Referring back to FIG. 2, the cover member 6 including the above such shape is formed by joining two sheets of different thickness formed in substantially the same three-dimensional shape (more specifically, stainless steel plates, for example), at a plurality of staking points P1, P2, P3, P4 and P5. The first staking point P1 is formed at the right edge 76R of the cover top 7, the second staking point P2 is formed in the upper edge 76U of the cover top 7 in the vicinity of the first notch part 76a, the third staking point P3 is formed in the upper edge 76U of the cover top 7 in the vicinity of the second notch part 76b, the fourth staking point P4 is formed in the left edge 81L on the left side in FIG. 2 of the cover side 8, and the first staking point P5 is formed in the lower edge 76D of the cover top 7. As the method of joining the two sheets, a known staking method can be used such as a method of joining by pressure deforming rivets in the plurality of staking points P1 to P5, or a method of joining by heating and pressurizing the two plates at the plurality of staking points P1 to P5.

Next, the results of various experiments performed for verifying the effects of the exhaust manifold cover C1 configured in the above way will be explained while referencing FIGS. 5 to 11.

Figure 5:
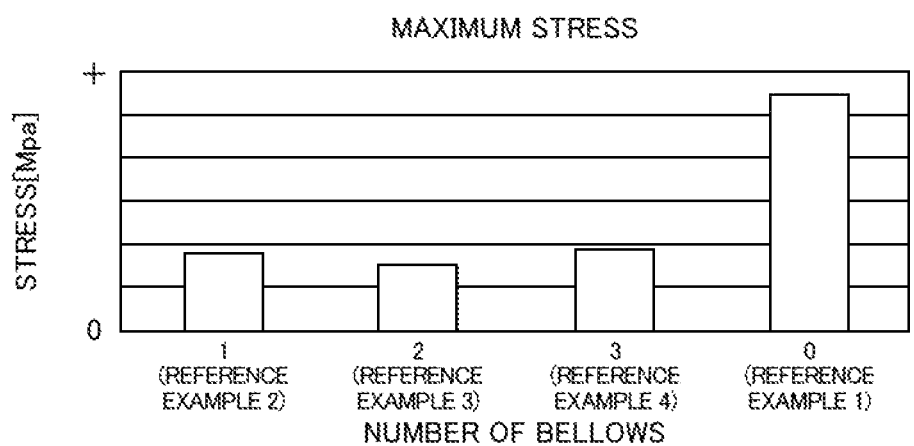
FIG. 5 is a graph showing the relationship between the number of bellows and the maximum stress.
Figure 6:
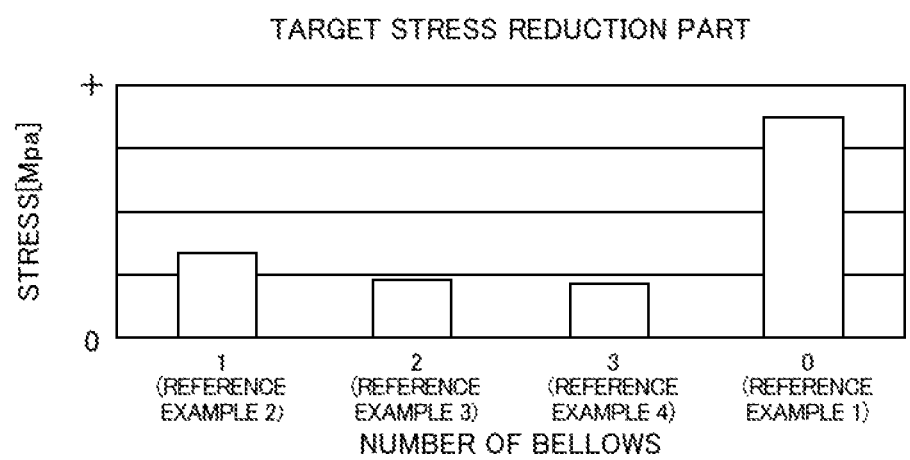
FIG. 6 is a graph showing the relationship between the number of bellows and the stress generated at a target stress reduction part.

FIGS. 5 to 7 are graphs showing the results of experiments performed in order to verify the effect that the number of bellows provided in the bellows section has on the function of the bellows section. It should be noted that, in the following explanation, number of bellows is defined as being the total number of the one among the ridges and grooves formed in the bellows section which more greatly contributes to the stress dispersing function (grooves in examples of FIGS. 5 to 9). In this experiment, an exhaust manifold cover having a number of bellows of 0 (hereinafter shall be Reference Example 1), an exhaust manifold cover having a number of bellows of 1 (hereinafter shall be Reference Example 2), an exhaust manifold cover having a number of bellows of 2 (hereinafter shall be Reference Example 3), and an exhaust manifold cover having a number of bellows of 3 (hereinafter shall be Reference Example 4) were prepared, and the distribution of stress generated when applying external force along the longitudinal direction to the first affixation section and second affixation section of these exhaust manifold covers, the distribution of deformation amount, maximum stress, and stress generated at the target stress reduction part were analyzed by simulation. It should be noted that, in this experiment, exhaust manifold covers not provided with any upper ribs were used as the exhaust manifold covers of Comparative Examples 1 and 2 and Examples 1 and 2, in order to verify the effect of only the bellows.

FIG. 5 is a graph showing the relationship between the number of bellows and maximum stress obtained by the above-mentioned experiment. FIG. 6 is a graph showing the relationship between the number of bellows and stress generated at the target stress reduction part obtained by the above-mentioned experiment. FIGS. 7A, 7B and 7C are graphs showing the stress distribution (top) and deformation amount distribution (bottom) of the exhaust manifold covers of Reference Example 2, Reference Example 3 and Reference Example 4, respectively. At the top of these FIGS. 7A to 7C, the portion indicated in grey indicates a portion in which greater stress than a predetermined value occurred, and at the bottom, the portion indicated in grey indicates a portion in which greater deformation amount than a predetermined value occurred.

As shown at the top of FIGS. 7A to 7C, relative to the deformation along the longitudinal direction, a relative large stress occurs in the bellows, in addition to the vicinity of the first and second affixation sections. In addition, in the case of comparing the grooves and ridges formed in the bellows, due to being configured so that the rigidity of the ridge is higher than the rigidity of the groove, greater stress occurs at the groove than the ridge. In other words, with the groove and ridge, the groove is considered to contribute more to the stress dispersing function. In addition, as increasing the number of bellows, the stress occurring in the vicinity of the first and second affixation sections, and at the target stress reduction part in the vicinity of the first affixation section is mitigated more. In addition, as shown at the bottom of FIGS. 7A to 7C, relative to deformation along the longitudinal direction, it deforms particularly greatly at the groove of the bellows, and the deformation amount of one groove decreases as increasing the number of bellows.

As shown in FIG. 5, the maximum stress relative to deformation in the longitudinal direction declines more dominantly in Reference Examples 2 to 4 in which the number of bellows is at least 1 than Reference Example 1 in which the number of bellows is 0. In addition, the effect of reducing this maximum stress does not change much between Reference Example 2 having a number of bellows of 1 and Reference Example 3 and Reference Example 4, which have a number of bellows of at least 2. However, as shown in FIG. 6, the stress occurring at the target stress reduction part that particularly should be given attention to reduce stress declines more dominantly in Reference Example 3 and Reference Example 4 in which the number of bellows is at least 2 than Reference Example 1 and Reference Example 2 in which the number of bellows is no more than 1.

In order to maintain sufficient stress dispersing function and the stress reducing function at the target stress reduction part, it is considered preferable to have a number of bellows of at least 2. It should be noted that, as shown in FIG. 5, the maximum stress is lower for Reference Example 3 in which the number of bellows is 2 than Reference Example 4 in which the number of bellows is 3. In other words, concerning the stress dispersing function, the number of bellows of 2 is considered higher than 3. This is considered to be because, when increasing the number of bellows, the width per 1 of the grooves becomes smaller, and thus the rigidity of the groove rises. In other words, when the rigidity of the groove rises, the deformation amount of the groove becomes smaller, and for this reason, the stress dispersing function is considered to decline more for Reference Example 4 than Reference Example 3.

Figure 8:
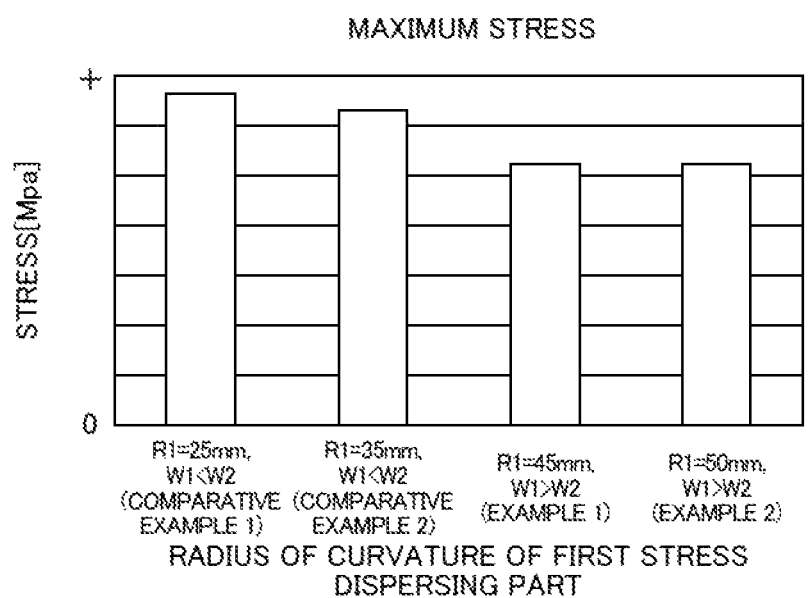
FIG. 8 is a graph showing the relationship between the radius of curvature of a first groove and the maximum stress.
Figure 9:
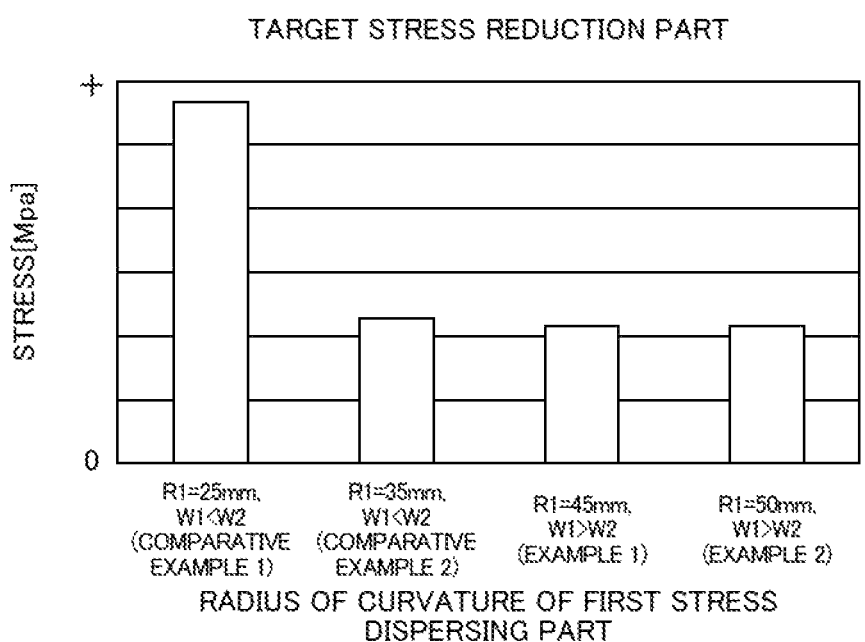
FIG. 9 is a graph showing the relationship between the radius of curvature of a first groove and the stress generated at the target stress reduction part.

FIGS. 8 and 9 are graphs showing the results of experiments verifying the effect of the radius of curvature of the first groove in the bellows section on the function of the bellows section. In this experiment, for an exhaust manifold cover having a number of bellows (total number of grooves) of 2 similarly to the exhaust manifold covers shown in FIGS. 2 to 4, etc., the change in function of the bellows section was verified when changing the center position and radius of curvature of these grooves, while constantly arranging the area of the bellows section and the distance between the apexes of two grooves and the fixing surface. More specifically, prepared were an exhaust manifold cover establishing the radius of curvature of the first groove at 25 mm (hereinafter defined as Comparative Example 1), an exhaust manifold cover establishing the radius of curvature of the first groove at 35 mm (hereinafter defined as Comparative Example 2); an exhaust manifold cover establishing the radius of curvature of the first groove at 45 mm (hereinafter defined as Example 1); and an exhaust manifold cover establishing the radius of curvature of the first groove at 50 mm (hereinafter defined as Example 2), and then the maximum stress generated when applying external force along the longitudinal direction to the first affixation section and second affixation section of these exhaust manifold covers and displacing these, and the stress generated at the target stress reduction part were analyzed by simulation.

It should be noted that, in the exhaust manifold covers of Comparative Examples 1 and 2 and Examples 1 and 2, since the radius of curvature of the first groove was made to change while constantly arranging the area of the bellows section and the distance between the apexes of two grooves and fixing surface, these exhaust manifold covers also differ in the radius of curvature of the second groove, and as a result, the ratio of widths of this first and second grooves (W2/W1) also differ, respectively. In Comparative Examples 1 and 2, the width W1 of the first groove is smaller than the width W2 of the second groove, and in Examples 1 and 2, the width W1 of the first groove is larger than the width W2 of the second groove. It should be noted that, in order to verify the effect of only the bellows, exhaust manifold covers in which no upper ribs are provided were used as the exhaust manifold covers of Comparative Examples 1 and 2 and Examples 1 and 2 also in this experiment.

FIG. 8 is a graph showing the relationship between the radius of curvature of the first groove and the maximum stress obtained by the above-mentioned experiment. FIG. 9 is a graph showing the relationship between the radius of curvature of the first groove and the stress generated at the target stress reduction part obtained by the above-mentioned experiment.

As shown in FIG. 8, if setting the radius of curvature R1 of the first groove close to the first affixation section (i.e. width W1 of the first groove) larger, the maximum stress will decline. In particular, if setting the width W1 of the first groove to larger than the width W2 of the second groove, the maximum stress will decline significantly. This is considered to be because, when increasing the width W1 of the first groove, the stress dispersing function on the first affixation section side of the bellows section improves. In addition, as shown in FIG. 9, the stress generated at the target stress reduction part also declines significantly when making the width W1 of the first groove larger than the width W2 of the second groove. From the above, when forming a plurality of grooves in the bellows section, and configuring a groove pair by two grooves of different width among this plurality of grooves, it is considered preferable for the width W1 of the first groove close to the first affixation section to be set larger than the width W2 of the second groove close to the second affixation section, in order to ensure sufficient stress reducing function and stress reducing function at the target stress reduction part.

Figure 10:
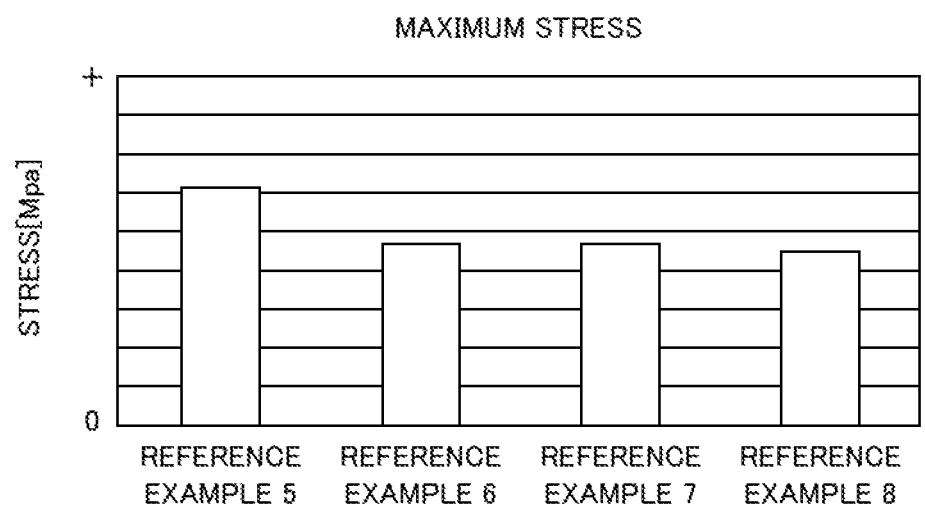
FIG. 10 is a graph showing the maximum stress in Reference Examples 1 to 4.

FIGS. 10 and 11 are views showing the results of experiments performed for verifying the effects of the upper rib and lower rib. In this experiment, prepared were an exhaust manifold cover not provided with either of the upper rib or lower rib (hereinafter defined as Reference Example 5), an exhaust manifold cover provided with only the lower rib (hereinafter defined as Reference Example 6), an exhaust manifold cover provided with only the upper rib (hereinafter defined as Reference Example 7), and an exhaust manifold cover provided with both the upper rib and lower rib (hereinafter defined as Reference Example 8), and then the distribution of stress generated when applying external force along the longitudinal direction to the first affixation section and second affixation section of these exhaust manifold covers and causing these to displace, and the maximum stress were analyzed by simulation. It should be noted that, in order to verify the effects of the upper rib and lower rib in this experiment, exhaust manifold covers provided with no bellows section were used as the exhaust manifold covers of Reference Examples 5 to 8.

FIG. 10 is a graph showing the maximum stress of the Reference Examples 5 to 8 obtained by the above-mentioned experiment. FIGS. 11A, 11B, 11C and 11D are views showing the stress distribution of the exhaust manifold covers of Reference Example 5, Reference Example 6, Reference Example 7 and Reference Example 8, respectively. In these FIGS. 11A to 11D, the portion shown in grey indicates a portion in which stress greater than a predetermined value occurred.

Figure 11A:
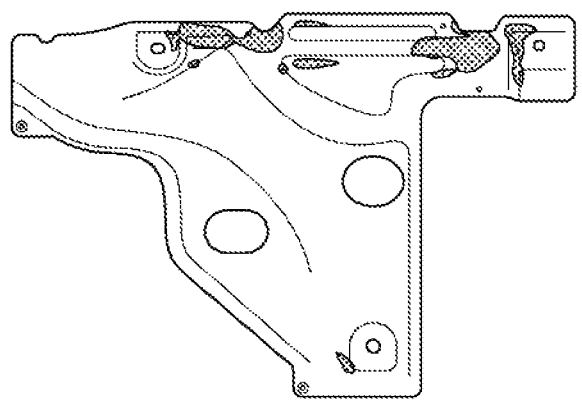
FIG. 11A is a view showing the stress distribution of an exhaust manifold cover of Reference Example 1.
Figure 11B:
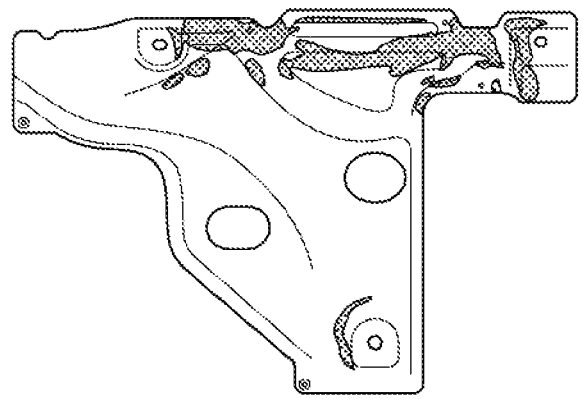
FIG. 11B is a view showing the stress distribution of an exhaust manifold cover of Reference Example 2.
Figure 11C:
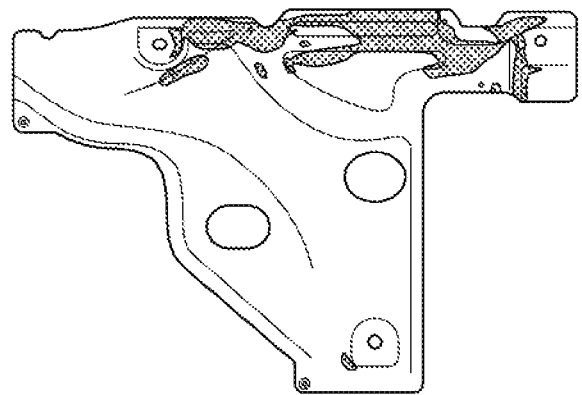
FIG. 11C is a view showing the stress distribution of an exhaust manifold cover of Reference Example 3.
Figure 11D:
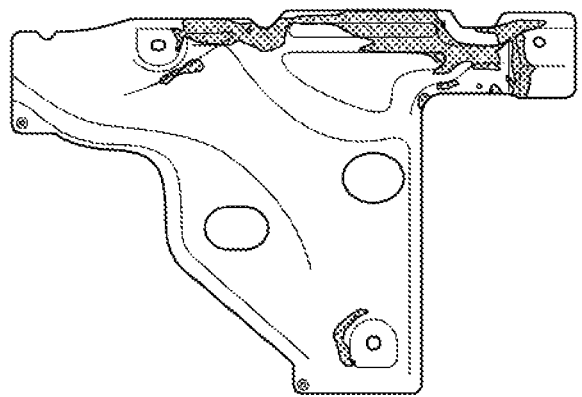
FIG. 11D is a view showing the stress distribution of an exhaust manifold cover of Reference Example 4.

As shown in FIG. 10, for the exhaust manifold covers of Reference Examples 6 to 8 including at least either of the upper rib and lower rib, the maximum stress declines more than the exhaust manifold cover of Reference Example 5 which is not provided with either of these. In other words, this upper rib and lower rib, in addition to the effect of suppressing deformation at the portions to which these are provided, are considered to also have the effect of reducing maximum stress. In addition, as shown in FIGS. 11A to 11D, when providing the upper rib and lower rib, the stress concentration at the target stress reduction part in the vicinity of the first affixation section is mitigated, and the stress distribution shifts to the central portion between the first affixation section and second affixation section. As shown in FIGS. 11C and 11D, the upper rib in particular is considered to have a high function of causing the stress generated at the target stress reduction part to shift to the central portion between the first affixation section and second affixation section (i.e. portion to which bellows section is provided in the exhaust manifold cover according to the embodiment shown in FIGS. 2 to 4, etc.). Therefore, by using the upper rib provided with such a function and the bellows in combination, it is considered possible to effectively reduce the stress generated at the target stress reduction part.

According to the exhaust manifold cover C1 of the present embodiment, the following effects are exerted.

(1) In the exhaust manifold cover C1, the sheet-like cover member 6 is fixed by contacting with the engine body 1, which is a heat source, at the first affixation section FP1 and second affixation section FP2. Then, the bellows section 9 including the ridge 92 and grooves 91, 93 extending along the transverse direction TD is provided between the first affixation section FP1 and second affixation section FP2 in the cover member 6. With the exhaust manifold cover C1, by providing the bellows section 9 between this first affixation section FP1 and second affixation section FP2, the elongation along the longitudinal direction LD of the bellows section 9 is actively permitted, relative to deformation along the longitudinal direction LD occurring due to thermal elongation of the engine body 1. Therefore, since the stress occurring at the cover member 6 is dispersed over a broad range, relative to the deformation in the longitudinal direction of the cover member 6, it is possible to suppress a stress concentration from occurring in the vicinity of the first and second affixation sections FP1, FP2 as mentioned above.

In addition, with the exhaust manifold cover C1, the integrated value along the longitudinal direction LD of the cross-sectional area of the cover member 6 is used as the target indicating the difference in magnitude of stress occurring during deformation along the longitudinal direction LD. When the integrated value of the cross-sectional area, i.e. volume, is small, since the portion capable of dispersing the stress becomes smaller by this amount, the stress concentration tends to occur at a specific location having such a small volume. With the exhaust manifold cover C1, a case is assumed of the integrated value of the cross-sectional area from the center point C between the first affixation section FP1 and the second affixation section FP2 until the first affixation section FP1 being smaller than the integrated value of the cross-sectional area from the center point C until the second affixation section FP2, i.e. case of stress concentration tending to occur more on the side of the first affixation section FP1 than on the side of the second affixation section FP2. Then, with the exhaust manifold cover C1, the groove pair configured by the two grooves 91, 93 of different width are formed in the bellows section 9, and the width W1 of the first groove 91 close to the first affixation section FP1 at which it is considered that stress concentration tends to occur as mentioned above among the two grooves 91, 93 constituting this groove pair, is made larger than the width W2 of the second groove 93 close to the second affixation section. Since greater extending is permitted in the longitudinal direction LD toward the first affixation section FP1 by the bellows section 9, it is possible to disperse the stress generated relative to deformation in the longitudinal direction LD over a wide range from the first affixation section FP1 until the second affixation section FP2, and possible to suppress stress concentration from occurring at the target stress reduction part existing on the side of the first affixation section FP1 which should be given particular attention.

(2) With the exhaust manifold cover C1, the shape of the cross section of the grooves 91, 93 formed in the bellows section 9 is defined as a circular arc specified by the central position and radius of curvature, and the radius of curvature R1 of the first groove 91 close to the first affixation section FP1 is made larger than the radius of curvature R2 of the second groove 93 close to the second affixation section FP2, and further, the distance between the center position O1 of the first groove 91 and the fixing surface S is set to be farther than the distance between the center position O2 of the second groove 93 and the fixing surface S. It is thereby possible to make the width W1 of the first groove 91 close to the first affixation section FP1 greater than the width W2 of the second groove 93 close to the second affixation section FP2, while constantly arranging the distances between the apexes of each groove 91, 93 and the fixing surface S. In other words, it is possible to keep the constraints in shape demanded when fixing the cover member 6 to the engine body 1, while realizing the stress dispersing function demanded in the bellows section 9. In addition, by establishing the cross-sectional shape of each groove 91, 93 in a smooth circular arc with the exhaust manifold cover C1, it is possible to disperse stress by a wider surface compared to a shape including a linear cross section, and consequently, it is possible to further improve the stress dispersing function of the bellows section 9.

(3) With the exhaust manifold cover C1, the engine body 1 and the exhaust manifold 2 thereof are defined as heat sources, and the cover member 6 is fixed by fastening at the first and second affixation sections FP1, FP2 to the engine body having large thermal deformation by the fastening bolts B1, B2. It is thereby possible to exhibit the stress dispersing function possessed by the cover member 6, and suppress a stress concentration from occurring at a specific location of the cover member 6.

(4) Between the first fixing point FP1 and the bellows section 9 having a small integrated value of cross-sectional area, it is considered that stress concentration tends to occur and deformation tends to occur as mentioned above, more than between the second fixing point FP2 and the bellows section 9. With the exhaust manifold cover C1, by forming the upper rib 77 extending along the longitudinal direction LD between the first affixation section FP1 and the bellows section 9, it is possible to suppress deformation between the first affixation section FP1 and the bellows section 9 at which it is considered that more stress concentration tends to occur. It should be noted that, when providing such a upper rib 77, as a result of deformation in the upper rib 77 being suppressed, stress concentration tends to occur at the surrounding of the upper rib 77; however, with the exhaust manifold cover C1, by providing the upper rib 77 in the bellows section 9 on the side of the first affixation section FP1 which has large width and exhibits high stress dispersing function, it is possible to suppress stress concentration in the vicinity thereof, while improving the rigidity of the weak portion on the side of the first affixation section FP1.

(5) With the exhaust manifold cover C1, in addition to setting the width of the first groove 91 close to the first affixation section FP1, at which it is considered that stress concentration tends to occur as mentioned above, to be larger among the grooves 91, 93 formed in the bellows section 9, the length along the longitudinal direction LD is made longer. It is thereby possible to exhibit greater stress dispersing function over a wider range on the side of the first affixation section FP1 at which stress concentration tends to occur, than on the side of the second affixation section FP2.

(6) With the exhaust manifold cover C1, the first and second affixation sections FP1, FP2 are provided to the bottoms of the first and second seating surfaces 73, 74 formed by conducting drawing on the respective sheet materials. Since it is thereby possible to fasten and fix the cover member 6 to the engine body 1 at the first and second affixation sections FP1, FP2 by configuring so as to avoid a member being provided in the vicinity of the first and second affixation sections FP1, FP2 of the engine body 1, the convenience improves. It should be noted that, when providing the first affixation section FP1 to the bottom of such a first seating surface 73 which is deeper, stress concentration tends to occur in the vicinity of this first seating surface 73 relative to the deformation in the longitudinal direction LD; however, with the exhaust manifold cover C1, by providing the first seating surface 73 to bellows section 9 on the side of the first affixation section FP1 which exhibits higher stress dispersing function, it is possible to suppress stress concentration on the side of the first affixation section FP1, while improving the convenience of fastening fixing.

Although embodiments of the present invention have been explained above, the present invention is not to be limited thereto. The configurations of details parts may be modified as appropriate within the scope of the spirit of the present invention.

For example, in the above-mentioned embodiment, a case is explained of establishing the engine body 1, exhaust manifold 2, exhaust pipe 4 and catalytic converter 5 as target heat sources, and applying the heat source cover of the present invention as the exhaust manifold cover C1 covering parts of these; however, the present invention is not to be limited thereto. In addition to the above such device, the heat source cover of the present invention can also be applied to a cover defining other heat sources as the target, such as a turbocharger cover C2 covering part of the turbocharger 3, and a catalytic converter cover C3 covering a part of the catalytic converter 5. In addition, in the above-mentioned embodiment, a case is explained of applying the heat source cover of the present invention as a cover equipped to a vehicle; however, the present invention is not to be limited thereto. The heat source cover of the present invention is not limited to a vehicle, and can also be applied to any device so long as including a heat source such as an aircraft, ship and boiler.

In addition, in the above-mentioned embodiment, a case is explained of fixing the cover member 6 by contacting with the target heat source at the three affixation sections FP1 to FP3; however, the number of affixation sections is not limited thereto. More specifically, the number of affixation sections may be two or more.

In addition, in the above-mentioned embodiment, a case is explained of configuring the cover member so as to exhibit larger stress dispersing function in the groove which is a convex shape towards the heat source by making the rigidity of the ridge higher than the rigidity of the groove when comparing between the groove and ridge formed in the bellows section, as well as forming two grooves of different width in the bellows section, and then configuring a pair of grooves from these; however, the present invention is not limited thereto. The number of grooves may be three or more. In addition, contrary to the above-mentioned embodiment, the rigidity of the groove may be made higher than the rigidity of the ridge so as to exhibit great stress dispersing function at the ridge which is a concave shape towards the heat source, as well as forming a plurality of such ridges in the bellows section, and then configuring a pair of ridges from two of different width among this plurality of ridges. In this case, it is preferable to make the width of the ridge close to the first affixation section among the two ridges constituting the pair of ridges larger than the width of the ridge close to the second affixation section.

EXPLANATION OF REFERENCE NUMERALS

C1 exhaust manifold cover (heat source cover)
1 engine body (heat source)
2 exhaust manifold (heat source)
4 exhaust pipe (heat source)
5 catalytic converter (heat source)
6 cover member
7 cover top
73 first seating surface
74 second seating surface
77 upper rib (rib)
8 cover side
9 bellows section
91 first groove
92 ridge
93 second groove
B1, B2 fastening bolt (fastening member)
FP1 first affixation section
FP2 second affixation section

The invention claimed is:

1. A heat source cover comprising a sheet-like cover member which covers at least part of a heat source,
wherein the cover member includes a first affixation section and a second affixation section which are fixed by contacting with the heat source,
wherein a bellows section, in which a ridge and a groove extending in a direction perpendicular to a center line passing through the first and second affixation sections are alternately formed, is provided between the first and second affixation sections of the cover member,
wherein an integrated value of the cross-sectional area perpendicular to the center line from a center point between the first affixation section and the second affixation section until the first affixation section is smaller than an integrated value of the cross-sectional area from the center point until the second affixation section,
wherein a pair of stripes configured by two grooves of different width or two ridges of different width is formed in the bellows section, and
wherein, among two stripes configuring the pair of stripes, a stripe closer to the first affixation section has larger width than a stripe closer to the second affixation section.

2. The heat source cover according to claim 1, wherein distances from respective apexes of the two stripes constituting the pair of stripes until a virtual fixing surface which includes the first affixation section and the second affixation section are substantially equal,
wherein a shape of a cross section parallel to the center line of the two stripes constituting the pair of stripes is a circular arc shape specified by a central position and a radius of curvature, and
wherein the stripe closer to the first affixation section among the two stripes constituting the pair of stripes has a larger radius of curvature, and the central position is farther from the fixing surface, than the stripe closer to the second fixing surface.

3. The heat source cover according to claim 2, wherein the heat source includes an engine body, and an exhaust manifold which is fixed to the engine body, and
wherein the cover member is fixed at the first and second affixation sections to the engine body by fastening with fastening members.

4. The heat source cover according to claim 2, wherein a rib extending substantially in parallel with the center line is formed in the cover member between the bellows section and the first affixation section.

5. The heat source cover according to claim 2, wherein the stripe closer to the first affixation section among the two stripes constituting the pair of stripes has a longer length along a direction substantially perpendicular to the center line than the stripe closer to the second affixation section.

6. The heat source cover according to claim 2, wherein the first affixation section and the second affixation section are respectively provided to bottoms of a first seating surface and a second seating surface formed by conducting drawing on sheet material, and
wherein the first seating surface is deeper than the second seating surface.

7. The heat source cover according to claim 1, wherein the heat source includes an engine body, and an exhaust manifold which is fixed to the engine body, and wherein the cover member is fixed at the first and second affixation sections to the engine body by fastening with fastening members.

8. The heat source cover according to claim 7, wherein a rib extending substantially in parallel with the center line is formed in the cover member between the bellows section and the first affixation section.

9. The heat source cover according to claim 7, wherein the stripe closer to the first affixation section among the two stripes constituting the pair of stripes has a longer length along a direction substantially perpendicular to the center line than the stripe closer to the second affixation section.

10. The heat source cover according to claim 7, wherein the first affixation section and the second affixation section are respectively provided to bottoms of a first seating surface and a second seating surface formed by conducting drawing on sheet material, and
wherein the first seating surface is deeper than the second seating surface.

11. The heat source cover according to claim 1, wherein a rib extending substantially in parallel with the center line is formed in the cover member between the bellows section and the first affixation section.

12. The heat source cover according to claim 11, wherein the stripe closer to the first affixation section among the two stripes constituting the pair of stripes has a longer length along a direction substantially perpendicular to the center line than the stripe closer to the second affixation section.

13. The heat source cover according to claim 11, wherein the first affixation section and the second affixation section are respectively provided to bottoms of a first seating surface and a second seating surface formed by conducting drawing on sheet material, and
wherein the first seating surface is deeper than the second seating surface.

14. The heat source cover according to claim 1, wherein the stripe closer to the first affixation section among the two stripes constituting the pair of stripes has a longer length along a direction substantially perpendicular to the center line than the stripe closer to the second affixation section.

15. The heat source cover according to claim 14, wherein the first affixation section and the second affixation section are respectively provided to bottoms of a first seating surface and a second seating surface formed by conducting drawing on sheet material, and
   wherein the first seating surface is deeper than the second seating surface.

16. The heat source cover according to claim 1, wherein the first affixation section and the second affixation section are respectively provided to bottoms of a first seating surface and a second seating surface formed by conducting drawing on sheet material, and
   wherein the first seating surface is deeper than the second seating surface.

\* \* \* \* \*